Patented Apr. 3, 1945

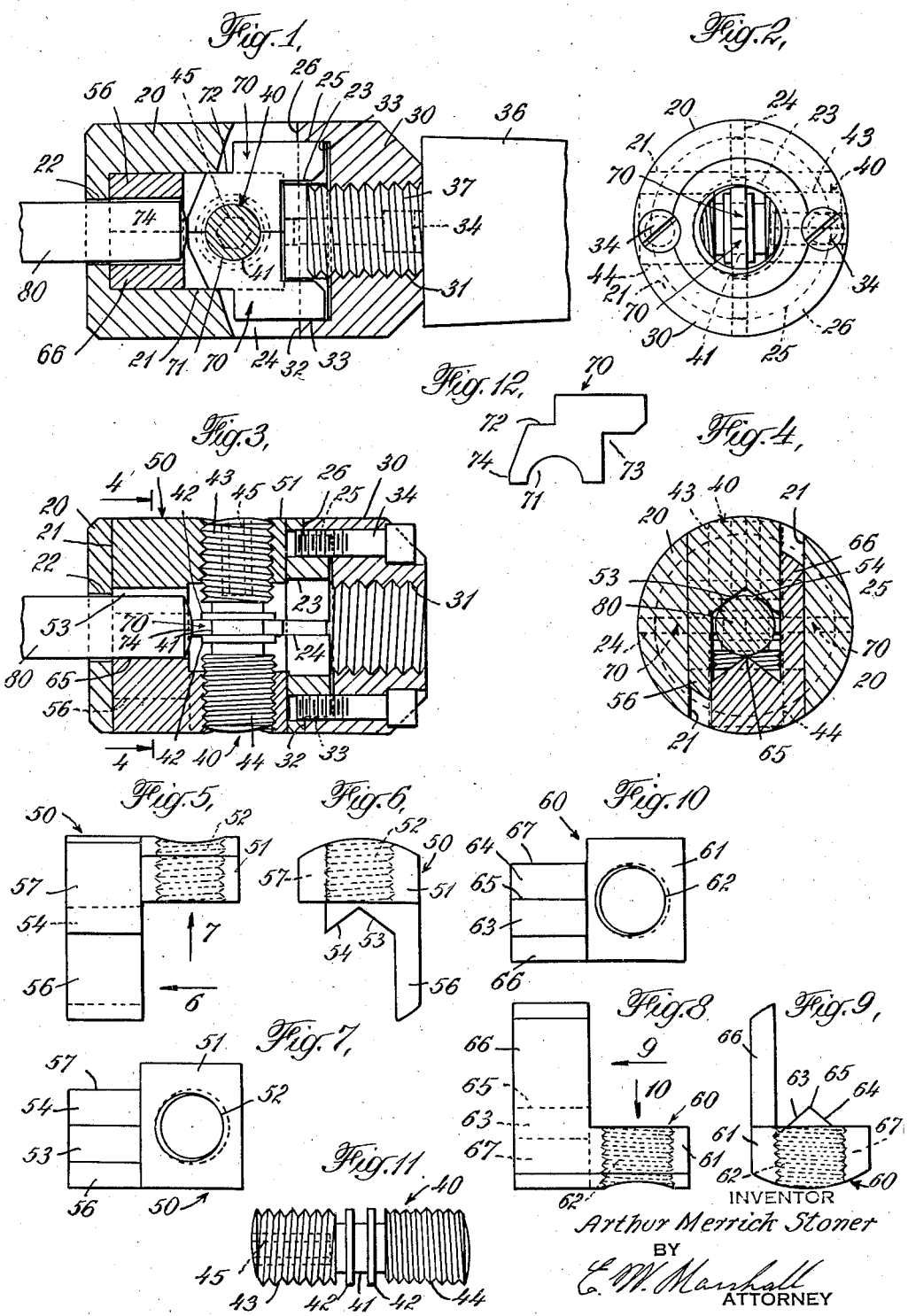

2,372,691

UNITED STATES PATENT OFFICE 2,372,691

CHUCK

Arthur Merrick Stoner, West Hartford, Conn., assignor to The Jacobs Manufacturing Company, Hartford, Conn., a corporation of Connecticut Application May 21, 1943, Serial No. 487,885

7 Claims. (Cl. 279—68)

This application relates to a novel chuck and its object is to provide a construction whereby the size of a chuck of the type wherein two clamping jaws are actuated by a right and left hand threaded screw may be reduced without sacrificing its strength and gripping power and thus reduce its weight and the cost of production. In a copending application, Serial No. 478,639, filed March 10, 1943, I have shown a chuck of the aforesaid type in which the actuating screw passes through and is surrounded by parts of the clamping jaws and has certain other improved characteristics. I have found that such a chuck can be further improved by making the clamping jaws in the novel manner disclosed herein and the present invention relates specifically to this new construction and arrangement of clamping jaws and the parts associated therewith.

Referring to the drawing:

Figure 1 is a central sectional side elevation of a chuck which is made according to and embodies this invention together with the spindle of a machine tool on which it is mounted.

Fig. 2 is a rear end elevation of the chuck shown in Fig. 1 with the spindle omitted.

Fig. 3 is a view similar to that shown in Fig. 1 without the spindle but taken at right angles to the latter figure.

Fig. 4 is a sectional end view of the parts shown in Fig. 3, the section being taken on the line 4—4 of the latter figure.

Figs. 5, 6 and 7 are respectively a side elevation, a rear end elevation and another side elevation of one of the clamping jaws. The views shown in Figures 6 and 7 are taken in the directions of the arrows 6 and 7 of Fig. 5.

Figs. 8, 9 and 10 are respectively a side elevation, a rear elevation and another side elevation of the other clamping jaw. The views shown in Figs. 9 and 10 are taken in the directions of the arrows 9 and 10 in Fig. 8.

Fig. 11 is an elevation of an adjusting screw for actuating the clamping jaws.

Fig. 12 is a side elevation of a locking plate.

20 designates a cylindrical chuck body through which is a transverse rectangular passage or guide 21. 22 is an axial bore through the front end of the body into the guide 21. 23 is an axial bore through the rear end of the body into the guide. A transverse slot 24 is cut through the approximate center of the rear end of the body into the guide 21 at right angles to the guide. 25 is a boss of reduced diameter formed in the rear end of the body and 26 is a shoulder at the base of the boss and at right angles to the axis of the body.

30 is an adapter which forms a continuation of the body 20. In the particular form shown, the adapter has an internally threaded axial bore 31 to receive the threaded end 37 of a spindle 36 of a machine tool. The front end of the adapter is turned to form a flat surface 32 and an internal cylindrical flange 33 which are adapted to form a close fit with the boss 25 and the shoulder 26 on the rear end of the chuck body. The adapter is secured to the body by screws 34.

40 is an adjusting screw for actuating the clamping jaws. This screw has a transverse groove 41 intermediate its ends with annular flanges 42, 42 on either side thereof and threaded portions 43, 44. The threads 43 are left hand and the threads 44 right hand and of finer pitch than that of the threads 43. 45 is a polygonal hole in one end of the screw for the reception of a wrench.

50 is one of a pair of clamping jaws. This, as shown in detail in Figs. 5–7 has a body 51 through which is an internally threaded bore 52 of left hand pitch adapted to fit the threads 43 of the screw 40. Two flat inwardly converging surfaces 53, 54 are formed in the body at one side of the bore 52 beyond which is a flat sided extension 56. The outer surface of the extension and the adjacent portion of the body in which is the bore 52 are flush but the opposite side of the body is cut back as at 57 for the purpose of this invention. This extension 56 is adapted to overlie a cut-back portion 67 of the other clamping jaw as shown in Figs. 8–10.

The other clamping jaw 60 (Figs. 8–10) has a body 61 through which is an internally threaded bore 62 of right hand pitch adapted to fit the threads 44 of the adjusting screw. Two flat sided surfaces 63, 64 at one side of the bore converge toward an edge 65. Beyond the surfaces 63, 64 is a flat sided extension 66 which is adapted to overlie the cut-back portion 57 of the clamping jaw shown in Figs. 5–7. The side of the body opposite the extension is cut back, as at 67, to clear the extension 56 of the other clamping jaw.

70 (Fig. 12) is one of a pair of like centering plates. These are preferably of hardened steel of a thickness approximately the same as the width of the slot 24. A semi-circular opening 71 is formed in the inner edge of each plate. 72 is a shoulder, the purpose of which will be pointed out later. The rear edge of each plate is cut back as at 73. The front edge of the plate is designated by the numeral 74.

The parts thus described are assembled in the following manner: the adjusting screw 40 is placed in the guide and moved to the rear end thereof. Then the centering plates 70 are inserted in the slot 24 in the chuck body and the slot 41 in the screw with the semi-circular parts 71 of the plates together encircling the reduced portion of the screw between the flanges 42. Then the screw and the centering plates are moved forwardly to the position in which they are shown in Fig. 1 with the front of the shoulder 72 of the centering plates forward of and beyond the bottom of the slot 24 so that they cannot move transversely. With the screw in this position the clamping jaws are placed in the guide 21 and moved toward each other by rotating the screw.

The boss 25 may be formed while the chuck body is affixed to a centering spindle by the clamping jaws assembled in it in accordance with the invention disclosed in the aforesaid application. Then the adapter is applied to the chuck body and secured thereto by the screws 34. Thereafter the whole structure may be supported on a spindle 36 and its outer surface ground.

In Figs. 1 and 3 a tool 80 is shown inserted in the chuck and engaged by its clamping jaws. From these figures it may be seen that the insertion of the tool is limited by the engagement of its inner end with the forward edges 74 of the locking plates.

Structural modifications may be made within the spirit and scope of this invention and I intend no limitations other than those imposed by the following claims.

What I claim is:

1. A chuck comprising a body having a transverse guide therein, a pair of right and left hand threaded clamping members slidably mounted in the guide, each of said members having a part adapted to engage an article and a portion of substantially the same depth as that of said part extending from one side of its article engaging part and in alinement therewith, overlapping the article engaging part of the other clamping member, a screw having right and left hand threads with its axis intersecting the normal to that of an engaged article, and means for preventing longitudinal movement of the screw.

2. A chuck comprising a body having a transverse guide therein, a pair of clamping jaws in the guide, said jaws having threaded bores and clamping surfaces offset from the bores, each jaw having an extension from one side of its clamping surface and being formed on the other side of its clamping surface to receive the extension of the other jaw, a screw having right and left hand threads passing through the bores in the clamping jaws and engaging the threads therein, and means for preventing longitudinal movement of the screw.

3. A chuck comprising a body having a transverse guide therein, a pair of clamping jaws in the guide, said jaws having threaded bores of different pitch and inclined clamping surfaces arranged to make three line contacts with an engaged article, said surfaces being offset from the bores, each jaw having an extension from one side of its clamping surface and being formed on the other side of its clamping surface to receive the extension of the other jaw, a screw having right and left hand threads of different pitch passing through the bores in the clamping jaws and engaging the threads therein, and means for preventing longitudinal movement of the screw.

4. A chuck comprising a body having a transverse guide therein, a slot cut through one end of the body extending into the guide at right angles to the guide, a pair of internally threaded members in the guide, each of said members having a part adapted to engage an article and a portion extending from one side of its article engaging part and overlapping the article engaging part of the other member, a screw having right and left hand threads surrounded by the members and a transverse groove intermediate its ends, and a locking plate in the slot in the body extending into the groove in the screw.

5. A chuck comprising a body having a transverse guide therein, a slot cut through one end of the body extending into the guide at right angles to the guide, a pair of internally threaded clamping jaws in the guide, said jaws having overlapping portions, a screw having right and left hand threads surrounded by the clamping jaws and a transverse groove intermediate its ends and a pair of locking plates in the slot in the body extending into the groove in the screw.

6. A chuck comprising a body having a transverse guide therein, a slot cut through one end of the body extending into the guide at right angles to the guide, a pair of clamping jaws in the guide, said jaws having threaded bores and clamping surfaces offset from the bores, each jaw having an extension from one side of its clamping surfaces and being formed on the other side of its clamping surfaces to receive the extension of the other jaw, a screw having right and left hand threads passing through the bores in the clamping jaws and engaging the threads therein and a transverse groove intermediate its ends, a pair of locking plates in the slot in the body extending into the groove in the screw, said plates having abutting edges provided with recesses in alinement with the groove in the screw.

7. A chuck comprising a body having a transverse guide therein, a slot cut through one end of the body extending into the guide at right angles to the guide, a pair of clamping jaws in the guide, said jaws having threaded bores of different pitch and inclined clamping surfaces arranged to make three line contacts with an engaged article, said surfaces being offset from the bores, each jaw having an extension from one side of its clamping surfaces and being formed on the other side of its clamping surfaces to receive the extension of the other jaw, a screw having right and left hand threads of different pitch passing through the bores in the clamping jaws and engaging the threads therein, and a pair of locking plates in the slot in the body extending into the groove in the screw, said plates having abutting edges provided with recesses in alinement with the groove in the screw, the forward edges of said plates extending beyond the threads of the screw.

ARTHUR MERRICK STONER.